United States Patent [19]
Swanson

[11] Patent Number: 5,345,041
[45] Date of Patent: Sep. 6, 1994

[54] APPARATUS FOR DISPENSING AND WEIGHING GRANULAR MATERIAL

[76] Inventor: Scott J. Swanson, 725 John St., Pecatonica, Ill. 61063

[21] Appl. No.: 51,696

[22] Filed: Apr. 26, 1993

[51] Int. Cl.⁵ .................. G01G 13/18; G01G 19/00
[52] U.S. Cl. ................................ 177/105; 177/145; 177/160; 222/56; 222/77
[58] Field of Search ............... 222/56, 77, 507; 177/105, 145, 160

[56] References Cited
U.S. PATENT DOCUMENTS

| | | | |
|---|---|---|---|
| 4,189,063 | 2/1979 | Mattiesen | 222/77 X |
| 4,431,071 | 2/1984 | Magat et al. | 177/149 |
| 4,723,614 | 2/1988 | Lahti | 177/120 |
| 4,982,873 | 1/1991 | Kelley et al. | 222/77 |

Primary Examiner—George H. Miller, Jr.
Attorney, Agent, or Firm—Leydig, Voit & Mayer

[57] ABSTRACT

Granular material stored in a hopper is dispensed therefrom by a rotatable auger which conveys the material to a discharge port for dropping into an underlying container. The container is supported by pivoted arms which are operably connected to a weighing scale for indicating the weight of the material dispensed into the container. The arms are adapted to be swung by the container between closed positions embracing and holding the container and open positions releasing the container.

7 Claims, 4 Drawing Sheets

APPARATUS FOR DISPENSING AND WEIGHING GRANULAR MATERIAL

BACKGROUND OF THE INVENTION

This invention relates to apparatus for dispensing and weighing granular material such as a livestock feed additive. It is important that a predetermined weight of additive be mixed with a predetermined quantity of feed and particularly when the additive is medicated.

Conventionally, a feed additive is dumped or scooped into a container which is placed on or hung from a weighing scale. It is laborious and time-consuming to deposit the exactly required weight of additive into the container.

SUMMARY OF THE INVENTION

The general aim of the present invention is to provide new and improved apparatus which significantly simplifies and speeds up the task of dispensing a predetermined weight of granular material into a container.

A more detailed object of the invention is to achieve the foregoing by providing apparatus in which the material is augured out of a hopper and into a container which is suspended from a scale that indicates when rotation of the auger should be stopped to cause an exact weight of material to be metered into the container.

A further object is to provide dispensing apparatus having unique arms for holding the container, the arms being adapted to automatically close and embrace the container when the container is pushed between the arms and being adapted to automatically open and release the container when the container is pulled outwardly from between the arms.

The invention also resides in the provision of a dispensing auger having a slide valve which controls a dispensing port and which restricts turning of the auger if the valve is in a closed position with respect to the port.

These and other objects and advantages of the invention will become more apparent from the following detailed description when taken in conjunction with the accompanying drawings.

DETAILED DESCRIPTION OF THE PREFERRED EMBODIMENT

Figures 1, 2:
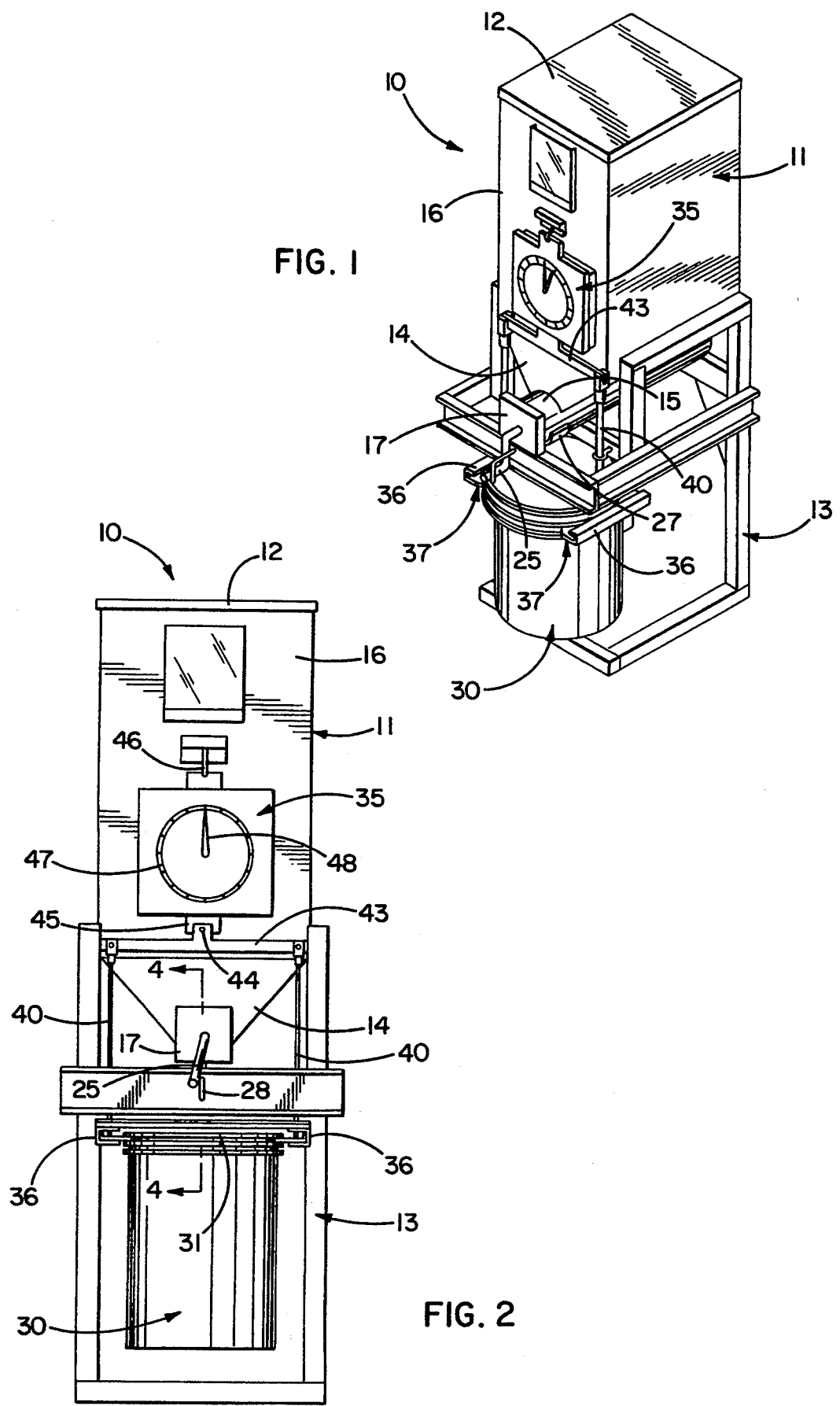
FIG. 1 is a perspective view of new and improved dispensing apparatus incorporating the unique features of the present invention.
FIGS. 2 and 3 are front and side elevational views, respectively, of the dispensing apparatus.

For purposes of illustration, the invention has been shown in the drawings as incorporated in apparatus 10 for dispensing dry granular material and particularly for dispensing livestock feed additives. The apparatus includes a generally box-like hopper 11 of rectangular cross-section and having a hinged lid 12 which may be swung open to enable a relatively large quantity of material to be dumped into the hopper. The hopper is supported a substantial distance above ground level by a frame-like structure which has been designated in its entirety by the reference numeral 13.

The lower end portion of the hopper 11 is formed by a downwardly tapered structure 14 which funnels the material into a front-to-rear extending tube 15 secured to the lower end of the tapered structure, the upper side of the tube being cut away beneath such structure so as to enable material to fall into the tube. The forward end of the tube projects forwardly beyond the front wall 16 of the hopper and is closed by an end cap 17 (FIG. 4).

Disposed in the tube 15 is an auger 20 (FIG. 4) having a central supporting shaft 21 and a helical conveying flight 22. The forward end portion of the shaft is journaled for rotation by the end cap 17 while the rear end portion of the shaft is journaled by the rear wall 23 of the hopper 11. An L-shaped hand crank 25 is attached to the forward end of the shaft and may be turned manually to rotate the auger 20 in the tube 15.

Material in the tube 15 is conveyed forwardly by the auger 20 when the latter is rotated. A discharge opening or port 26 (FIG. 4) is formed in the lower side of the tube 15 near the forward end thereof and, when the port is open, the forwardly conveyed material drops downwardly through the port. A valve in the form of a slide 27 having a curvature corresponding to that of the tube is slidably supported beneath the tube and may be moved to selectively open and close the port. A generally Z-shaped operating handle 28 is attached to the forward end of the slide valve 27 and projects forwardly beyond the end cap 17. The valve 27 is opened and closed when the handle is pushed rearwardly and pulled forwardly, respectively.

Figure 4:
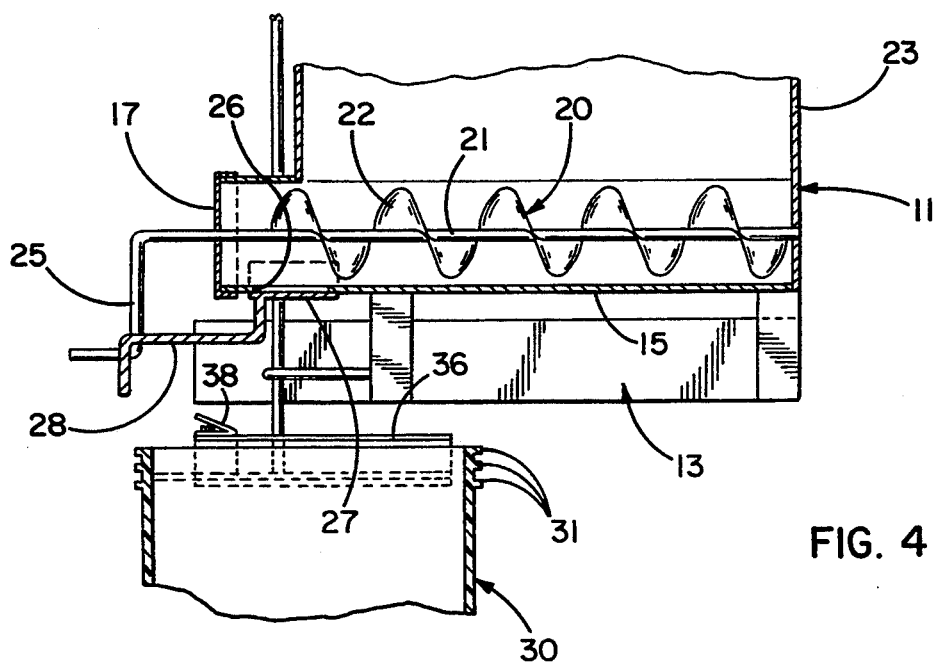
FIG. 4 is an enlarged fragmentary cross-section taken substantially along the line 4—4 of FIG. 2.
Figure 5:
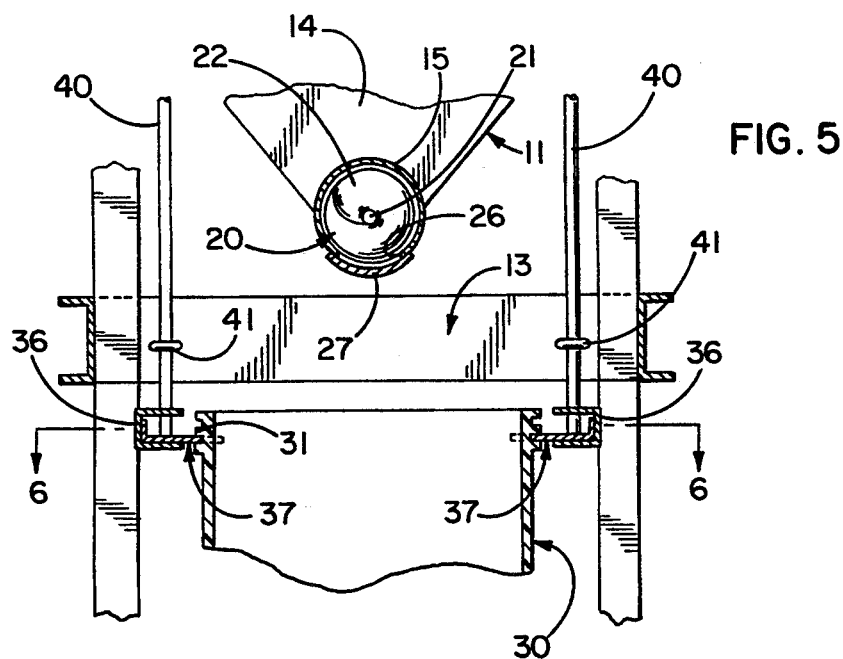
FIG. 5 is an enlarged fragmentary cross-section taken substantially along the line 5—5 of FIG. 3.

Advantageously, the operating handle 28 of the valve 27 projects into the rotational path of the crank 25 when the valve is in its closed position (see FIGS. 2 and 4). Thus, the handle engages the crank and prevents the auger 20 from being rotated through more than 360 degrees when the valve is closed. This prevents the auger from being operated in such a manner as to compact material near the front of the tube 15 and prevents excessive loads on the auger and its supporting structure. When the valve 27 is open, the handle 28 is located inwardly of the crank and permits free rotation thereof.

In carrying out the invention, material dispensed through the port 26 by the auger 20 is discharged into a container 30 and is weighed as an incident to such discharge. In this particular instance, the container is a generally cylindrical five gallon bucket made of plastic and formed with three vertically spaced and radially outwardly projecting lips 31 (FIG. 4) which extend circumferentially around the upper end portion of the bucket.

Figure 3:
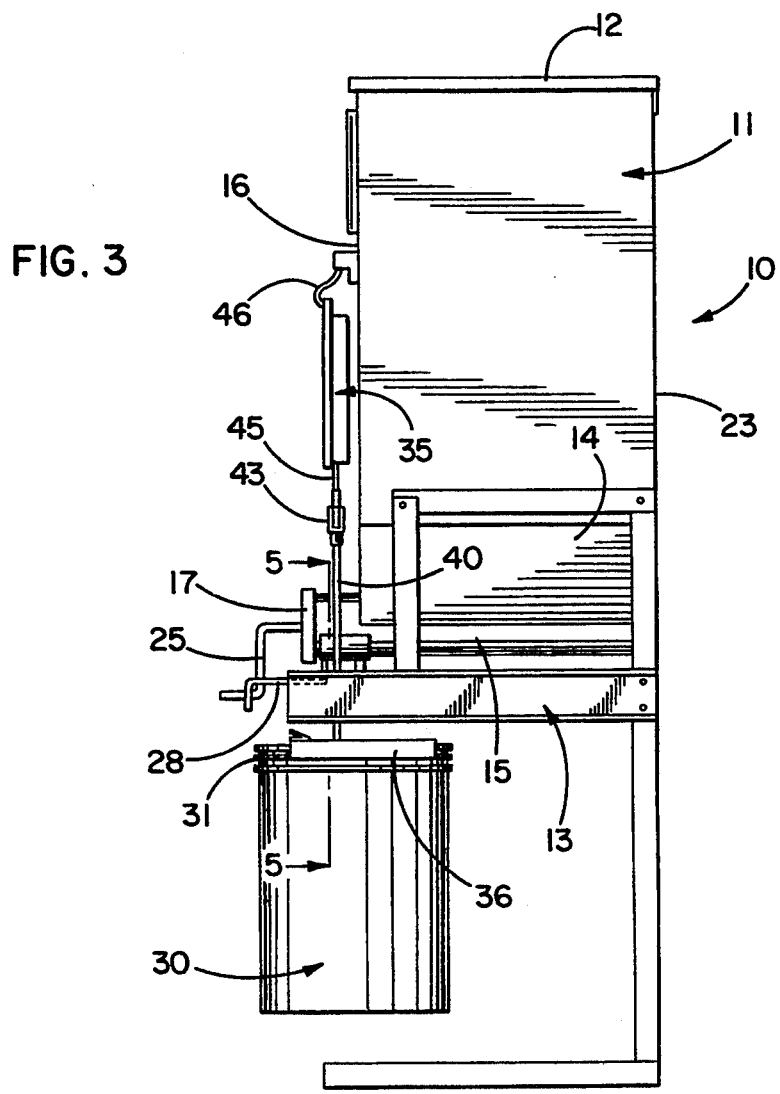
Figure 7:
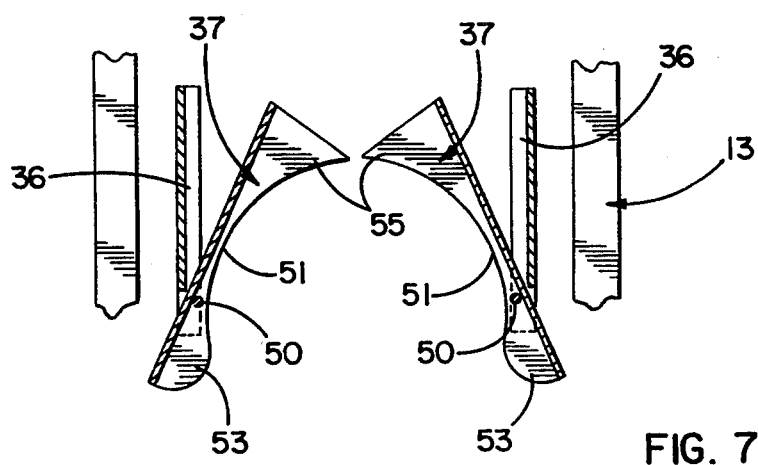
FIG. 7 is a view similar to FIG. 6 but shows the arms in moved positions.
Figure 8:
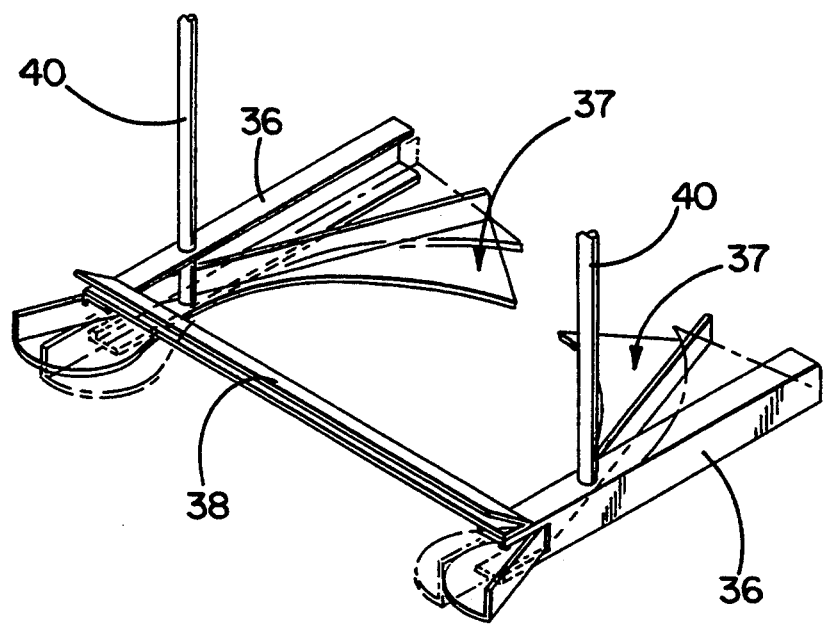
FIG. 8 is a perspective view of the container-holding arms.

Means are provided for releasably holding the bucket 30 and for connecting the bucket to a scale 35 (FIGS. 1-3) for weighing the material dispensed into the bucket. Herein, these means comprise a pair of laterally spaced and generally U-shaped channels 36 (FIG. 3 and FIGS. 5-8) which support arms 37 (to be described in detail subsequently) for holding the bucket. The forward end portions of the channels 36 extend forwardly from the frame 13 and are rigidly connected by a crosspiece 38 (FIG. 8).

Secured to and extending upwardly from each channel 36 near the forward end thereof is a round rod 40. Each rod is slidably supported by an eye bolt 41 (FIG. 5) attached to the frame 13. The upper ends of the two rods are pivotally connected to the ends of a laterally extending beam 43 which, in turn, is pivotally connected at its midpoint at 44 (FIG. 2) to the load arm 45 of the scale 35. The latter is suspended from the front wall 16 of the hopper 11 by a hook 46 and includes a dial 47 and a rotatable pointer 48.

Thus, as the auger 20 is rotated to discharge material into the bucket 30, the weight of the material is indicated by the scale 35. Rotation of the auger is stopped when the scale indicates that a desired weight of material has been metered into the bucket.

Advantageously, the arms 37 enable the bucket 30 to be quickly inserted into and removed from the apparatus 10. For this purpose, each arm is pivotally connected at 50 (FIG. 7) to the forward end portion of the adjacent channel 36. The arms are adapted to straddle the bucket and are adapted to swing about the pivots 50 between closed positions shown in FIG. 6 and open positions shown in FIG. 7. Each arm includes a generally horizontally disposed section of sheet metal having an arcuate edge portion 51 whose curvature corresponds to that of the bucket.

Figure 6:
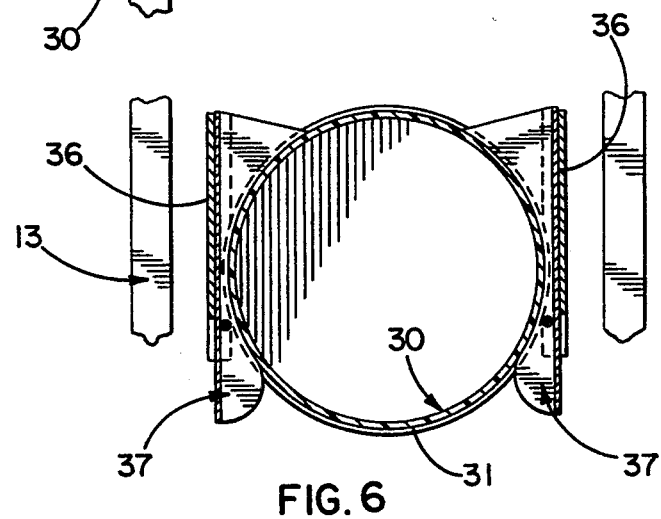
FIG. 6 is a fragmentary cross-section taken substantially along the line 6—6 of FIG. 5 and primarily shows the arms for holding the container.

FIG. 6 shows the arms 37 in their closed positions and holding the bucket 30. When the arms are so disposed, the edge portion 51 of the arms embrace the bucket and hook beneath one of the lips 31 thereof. Removal of the bucket is effected simply by pulling outwardly on the bucket. As an incident thereto, the forward side portions of the bucket cam against forward sections 53 (FIG. 7) of the arms and cause the arms to swing open about the pivots 50 so as to release the bucket. To install the bucket, the latter is simply pushed into the arms 37 while the arms are open as shown in FIG. 7. When rear side portions of the bucket engage rear sections 55 of the arms, the arms are cammed to their closed positions to cause the arcuate edge portions 51 of the arms to embrace the bucket and hook beneath its lip 31. The bucket thus is held securely beneath the discharge port 26 of the auger tube 15.

From the foregoing, it will be apparent that the present invention brings to the art new and improved apparatus 10 in which an auger 20 dispenses material into a container 30 and in which the material is automatically weighed as it is dispensed. Precise weights of material may be metered into the bucket by controlling rotation of the auger while watching the scale 35. The pivoted arms 37 enable quick and easy installation and removal of the bucket and securely hold the bucket in its installed position.

I claim:

1. Apparatus for dispensing and weighing granular material, said apparatus comprising a hopper for holding a quantity of said material, said hopper having a bottom portion with a rotatable auger and with a downwardly opening dispensing port whereby, upon rotation of said auger, material in said hopper is conveyed toward said dispensing port, means for selectively opening and closing said dispensing port, material conveyed toward said dispensing port by said auger being discharged downwardly through said port upon reaching said port when said port is open, a container, means releasably supporting said container beneath said dispensing port whereby material discharged through said port falls into said container, a weighing scale supported by said hopper, and means connected between said scale and said supporting means and operable to cause said scale to indicate the weight of material in said container.

2. Apparatus as defined in claim 1 further including a hand crank connected to one end of said auger and operable when turned to cause rotation of said auger, said means for opening and closing said dispensing port comprising a slide disposed beneath said port, an operating handle connected to said slide for moving said slide back and forth between open and closed positions relative to said port, said operating handle extending into the path of said crank when said slide is in said closed position and restricting turning of said crank, said operating handle being located out of the path of said crank when said slide is in said open position and freeing said crank for turning.

3. Apparatus as defined in claim 2 in which said supporting means include arms positioned to straddle said container, said connecting means comprising laterally spaced members secured to and extending upwardly from said arms and further comprising a laterally extending beam secured to and extending between said arms and operably connected to said scale.

4. Apparatus as defined in claim 3 in which said container is generally cylindrical and includes an outwardly protruding and circumferentially extending lip, said arms being positioned to straddle said container and being pivotally supported to swing between open and closed positions relative to said container, said arms having curved edge portions shaped to hook beneath said lip and embrace said container when said arms are in their closed positions, said edge portions releasing said lip when said arms are in their open positions.

5. Apparatus as defined in claim 1 in which said container is generally cylindrical and includes an outwardly protruding and circumferentially extending lip, said supporting means including arms positioned to straddle said container and pivotally supported to swing between open and closed positions relative to said container, said arms having curved edge portions shaped to hook beneath said lip and embrace said container when said arms are in their closed positions, said edge portions releasing said lip when said arms are in their open positions.

6. Apparatus as defined in claim 5 in which said edge portions of said arms include first sections which are engaged by said container and cause said arms to swing from their open positions to their closed positions as said container is pushed between said arms, said edge portions including second sections which are engaged by said container and cause said arms to swing from their closed positions to their open positions as said container is pulled from between said arms.

7. Apparatus for dispensing and weighing granular material, said apparatus comprising a hopper for holding a quantity of said material, said hopper having a bottom portion with a rotatable auger and with a downwardly opening dispensing port whereby, upon rotation of said auger, material in said hopper is conveyed toward said dispensing port, means for selectively opening and closing said dispensing port, material conveyed toward said dispensing port by said auger being discharged downwardly through said port upon reaching said port when said port is open, a container, a pair of arms supporting said container beneath said dispensing port whereby material discharged through said port falls into said container, said arms being pivotally supported to swing to open positions releasing said container, a weighing scale supported by said hopper, and means connected between said scale and said supporting arms and operable to cause said scale to indicate the weight of material in said container when said container is supported by said arms.

* * * * *